United States Patent
Medam et al.

(10) Patent No.: US 10,956,994 B2
(45) Date of Patent: Mar. 23, 2021

(54) METHOD AND SYSTEM FOR FACILITATING PROCESSING OF AN ORDER AT A FACILITY

(71) Applicant: THULISHA REDDY TECHNOLOGIES LLC, Redmond, WA (US)

(72) Inventors: Kalavathi Medam, Redmond, WA (US); Riya Harshad Nadkarni, Sammamish, WA (US); Arjun Zakir Nadkarni, Sammamish, WA (US)

(73) Assignee: THULISHA REDDY TECHNOLOGIES LLC, Redmond, WA (US)

( * ) Notice: Subject to any disclaimer, the term of this patent is extended or adjusted under 35 U.S.C. 154(b) by 138 days.

(21) Appl. No.: 16/034,075

(22) Filed: Jul. 12, 2018

(65) Prior Publication Data
US 2019/0019260 A1    Jan. 17, 2019

Related U.S. Application Data

(60) Provisional application No. 62/532,001, filed on Jul. 13, 2017.

(51) Int. Cl.
| | |
|---|---|
| *G06Q 50/12* | (2012.01) |
| *G06Q 10/02* | (2012.01) |
| *H04W 4/021* | (2018.01) |
| *G06Q 30/06* | (2012.01) |
| *G06K 7/14* | (2006.01) |

(52) U.S. Cl.
CPC ........... *G06Q 50/12* (2013.01); *G06K 7/1417* (2013.01); *G06Q 10/02* (2013.01); *G06Q 30/0603* (2013.01); *G06Q 30/0633* (2013.01); *H04W 4/021* (2013.01)

(58) Field of Classification Search
CPC .... G06Q 10/02; G06Q 50/12; G06Q 30/0603; G06Q 30/0633; G06K 7/1417; H04W 4/021
USPC ................................................. 705/2, 5, 7.19
See application file for complete search history.

(56) References Cited

U.S. PATENT DOCUMENTS

| | | | |
|---|---|---|---|
| 7,385,479 B1 * | 6/2008 | Green | G06Q 10/00 340/286.02 |
| 8,718,684 B2 * | 5/2014 | Ellis | H04W 4/14 455/412.2 |

(Continued)

*Primary Examiner* — Ronald D Hartman, Jr.

(57) ABSTRACT

Disclosed is a method of facilitating processing of an order at a facility. The method may include receiving, using a communication device, a presence indication of a customer device. Further, the method may include receiving, using the communication device, a reservation request from the customer device. Further, the reservation request may be associated with a reservable area of the facility. Further, the method may include generating, using a processing device, a booking code based on the presence indication and the reservation request. Further, the method may include transmitting, using the communication device, the booking code to the customer device. Further, the method may include receiving, using the communication device, an order data from the customer device. Further, the method may include transmitting, using the communication device, each of the order data and the booking code to at least one facility processing device.

16 Claims, 8 Drawing Sheets

(56) References Cited

U.S. PATENT DOCUMENTS

| | | | | |
|---|---|---|---|---|
| 8,799,083 | B1* | 8/2014 | Silver | G06Q 10/02 705/15 |
| 9,760,958 | B2* | 9/2017 | Cloin | G06Q 50/12 |
| 10,185,921 | B1* | 1/2019 | Heller | E05B 65/0035 |
| 2002/0095312 | A1* | 7/2002 | Wheat | G06Q 10/02 455/412.1 |
| 2003/0125974 | A1* | 7/2003 | Frich | G06Q 20/206 235/381 |
| 2004/0143503 | A1* | 7/2004 | Suthar | G06Q 30/06 705/15 |
| 2004/0158494 | A1* | 8/2004 | Suthar | G06Q 30/06 705/15 |
| 2004/0210621 | A1* | 10/2004 | Antonellis | G06Q 10/087 709/200 |
| 2004/0259630 | A1* | 12/2004 | Huard | G06Q 30/02 463/25 |
| 2006/0004606 | A1* | 1/2006 | Wendl | G06Q 10/0631 705/2 |
| 2006/0186197 | A1* | 8/2006 | Rosenberg | G06Q 30/00 235/380 |
| 2007/0087834 | A1* | 4/2007 | Moser | G07F 17/32 463/42 |
| 2010/0022221 | A1* | 1/2010 | Yi | G06Q 10/02 455/414.1 |
| 2012/0095791 | A1* | 4/2012 | Stefik | G08B 25/12 705/5 |
| 2012/0123915 | A1* | 5/2012 | Risnoveanu | G06Q 20/10 705/30 |
| 2012/0323643 | A1* | 12/2012 | Volz | G06Q 30/0266 705/13 |
| 2013/0059598 | A1* | 3/2013 | Miyagi | H04W 4/023 455/456.1 |
| 2013/0090959 | A1* | 4/2013 | Kvamme | G06Q 10/02 705/5 |
| 2013/0191229 | A1* | 7/2013 | Rodgers | G06Q 30/06 705/15 |
| 2013/0282533 | A1* | 10/2013 | Foran-Owens | G06Q 30/0641 705/27.1 |
| 2013/0325526 | A1* | 12/2013 | Tyler | G06Q 10/02 705/5 |
| 2013/0332208 | A1* | 12/2013 | Mehta | G06Q 10/02 705/5 |
| 2014/0006182 | A1* | 1/2014 | Wilson | G06Q 30/0635 705/15 |
| 2014/0006205 | A1* | 1/2014 | Berry | G06Q 20/322 705/26.7 |
| 2014/0039946 | A1* | 2/2014 | Spiker | G04F 3/08 705/5 |
| 2014/0062687 | A1* | 3/2014 | Voticky | H04W 4/029 340/438 |
| 2014/0156319 | A1* | 6/2014 | Deeb | G06Q 30/06 705/5 |
| 2014/0278589 | A1* | 9/2014 | Rados | G06Q 30/0633 705/5 |
| 2014/0278613 | A1* | 9/2014 | Suzuki | G06Q 50/12 705/5 |
| 2014/0310030 | A1* | 10/2014 | Cheranda | G06Q 10/02 705/5 |
| 2014/0343976 | A1* | 11/2014 | Ahluwalia | G06Q 10/02 705/5 |
| 2014/0364203 | A1* | 12/2014 | Nelson | G07F 17/3218 463/31 |
| 2015/0213565 | A1* | 7/2015 | Garrett | G06Q 50/12 705/15 |
| 2016/0055598 | A1* | 2/2016 | Ramini | G06Q 20/14 705/15 |
| 2016/0210675 | A1* | 7/2016 | Smart | G06Q 10/02 |
| 2016/0260135 | A1* | 9/2016 | Zomet | H04L 12/2834 |
| 2016/0314132 | A1* | 10/2016 | Lineberger | G06Q 10/1093 |
| 2016/0321565 | A1* | 11/2016 | Mendoza | G06Q 10/02 |
| 2016/0364823 | A1* | 12/2016 | Cao | G06Q 50/30 |
| 2017/0032421 | A1* | 2/2017 | Semple | G06Q 30/02 |
| 2017/0061508 | A1* | 3/2017 | Sen | G08G 1/148 |
| 2017/0083969 | A1* | 3/2017 | Takeda | G06F 16/3344 |
| 2017/0098054 | A1* | 4/2017 | Hayward | G06Q 50/163 |
| 2017/0103374 | A1* | 4/2017 | Bhattacharjee | G06Q 20/202 |
| 2017/0109843 | A1* | 4/2017 | Berg | G06Q 50/12 |
| 2017/0278022 | A1* | 9/2017 | Mimassi | G06Q 50/12 |
| 2017/0278202 | A1* | 9/2017 | Mimassi | G06Q 30/0635 |
| 2017/0278203 | A1* | 9/2017 | Mimassi | G06Q 50/12 |
| 2017/0308818 | A1* | 10/2017 | Almishari | G06Q 10/02 |
| 2017/0364836 | A1* | 12/2017 | Li | G06Q 10/02 |
| 2018/0357668 | A1* | 12/2018 | Kanemoto | G06Q 30/0264 |
| 2019/0005389 | A1* | 1/2019 | Glyman | G06Q 10/02 |
| 2019/0213506 | A1* | 7/2019 | Greenberger | H04L 67/22 |
| 2019/0279475 | A1* | 9/2019 | Watt | H04B 10/116 |
| 2020/0065718 | A1* | 2/2020 | Moore | G06Q 10/02 |
| 2020/0167701 | A1* | 5/2020 | Debono | G06F 9/542 |
| 2020/0167726 | A1* | 5/2020 | Lee | G06Q 10/0831 |
| 2020/0219204 | A1* | 7/2020 | Moetteli | G06Q 50/01 |
| 2020/0265104 | A1* | 8/2020 | Belt | H04W 4/90 |
| 2020/0302740 | A1* | 9/2020 | Cleveland | G07F 17/3225 |

* cited by examiner

METHOD AND SYSTEM FOR FACILITATING PROCESSING OF AN ORDER AT A FACILITY

The current application claims a priority to the U.S. Provisional Patent application Ser. No. 62/532,001 filed on Jul. 13, 2017.

FIELD OF THE INVENTION

The present invention relates generally relates to the field of data processing. More specifically, the present disclosure relates to methods and systems of automating experience at a facility.

BACKGROUND OF THE INVENTION

When customers visit a restaurant for having a meal alone or as a group (of family or friends), they request the restaurant staff at the reception to allocate a table for the number of persons and wait for the table to be assigned. This may take anywhere between 5-60 minutes or more. While waiting for the table, the customers get bored as they cannot leave the place since they do not know when they will be called in. Once the table is assigned and they are seated, they go through the menu to choose the food of their choice and wait for a restaurant staff to take the food order and the waiting time starts again (which takes another 10-30 minutes). Thereafter, the customers have to look out for the staff member if they would like to place an additional order. Therefore, each time customers go for a meal at a restaurant, they spend a considerable amount of time waiting and this spoils the dining experience.

While the current restaurant systems use computing systems at various points of the service, but these computing systems are all disconnected and involve different restaurant staff at each stage and makes the customers wait multiple times and adds a lot of non-dining time to the dining experience. Additionally, these wait times increase the table time per customer and thereby decreasing revenues for the restaurant.

Accordingly, there is a need for methods and systems for automating restaurant dining experience which may minimize the wait times, optimize the whole process using technology and improve the customer experience and may overcome one or more of the abovementioned problems and/or limitations.

SUMMARY

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

According to an aspect, a method of facilitating processing of an order at a facility is disclosed. The method may include receiving, using a communication device, a presence indication of a customer device. Further, the presence indication represents a location of the customer device in proximity to the facility. Further, the method may include receiving, using the communication device, a reservation request from the customer device. Further, the reservation request may be associated with a reservable area of the facility. Further, the method may include generating, using a processing device, a booking code based on the presence indication and the reservation request. Further, the method may include transmitting, using the communication device, the booking code to the customer device. Further, the method may include receiving, using the communication device, an order data from the customer device. Further, the method may include transmitting, using the communication device, each of the order data and the booking code to at least one facility processing device.

According to another aspect, a system for facilitating processing of an order at a facility is disclosed. The system may include a communication device configured for receiving a presence indication of a customer device. Further, the presence indication represents location of the customer device in proximity to the facility. Further, the communication device may be configured for receiving a reservation request from the customer device. Further, the reservation request may be associated with a reservable area of the facility. Further, the communication device may be configured for transmitting a booking code to the customer device. Further, the communication device may be configured for receiving an order data from the customer device. Further, the communication device may be configured for transmitting each of the order data and the booking code to at least one facility processing device. Further, the system may include a processing device configured for generating, using a processing device, the booking code based on the presence indication and the reservation request.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
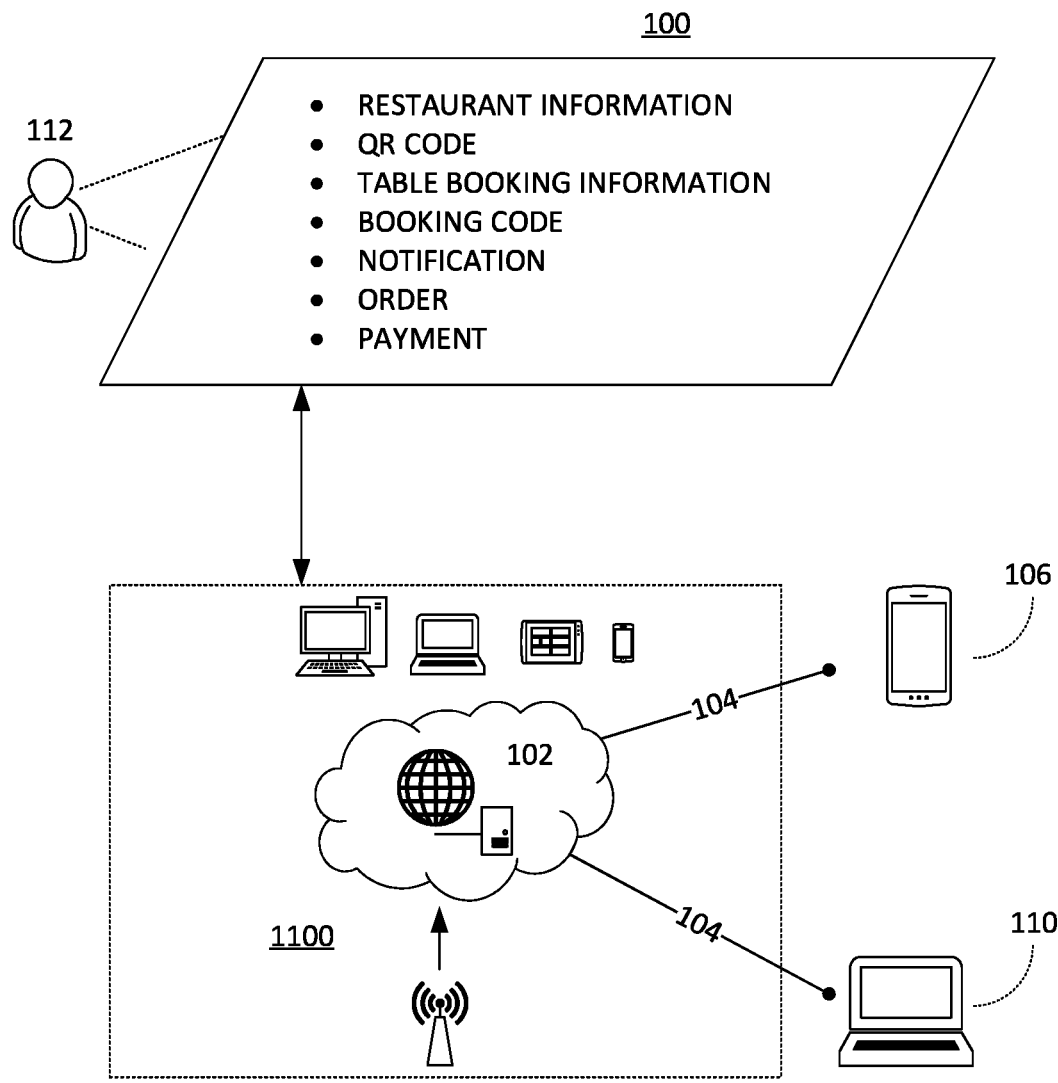
FIG. 1 is an illustration of a platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

Overview

According to some aspects, an automated system is provided that allows the customers to optimally utilize the time waiting for the table to review the menu and order food so they can get their food as soon as they are seated at the table and reduce waiting time. This also helps the restaurant to serve more customers by reducing the table time as the customers are not spending time ordering and waiting for food at the table. This also enhances customers' dining experience as they are optimally engaged the whole time.

According to some aspects, a unique booking code is provided as soon as the customer scans the QR code available at the restaurant reception using their smartphone and their request for table booking is submitted. This unique booking code allows them to order food so that the kitchen can prepare the food while they are waiting for the table. Also, each member of the dining group can order food from their own smartphone. Food is served as soon as they are seated at the table and reduce the non-dining time and improve customer experience by keeping them optimally engaged.

According to some aspects, the disclosed automated system includes multiple components including one or more of a smartphone (with camera, web browser, Internet connectivity), QR Code scanner applications, Web Browser, QR Code Tag in Reception, QR Code Tag on Dining Table, Internet-hosted Web Services, a Central Database, a smartphone application and a website.

According to some aspects, a system along with software is provided with multiple components including one or more of a central database, Internet-hosted web services, website and smartphone application (for multiple phone versions like iPhone, Android phone, and Windows Phone). The restaurant information is first captured into the central database using the website. Customized QR Code tags for reception of each restaurant and for each table in the restaurant are printed from the website. The QR Code tags are placed in the restaurant reception and on all tables. The users (customers/staff) will use their smartphones to scan the QR Codes to make a booking, confirm seating at the table and release the table at the end of booking, use one of the smartphone application or the website to order food items and make payment.

The present disclosure includes many aspects and features. Moreover, while many aspects and features relate to, and are described in, the context of facility automation, embodiments of the present disclosure are not limited to use only in this context. For example, the disclosed techniques may be used to automate hospitals.

FIG. 1 is an illustration of an online platform 100 consistent with various embodiments of the present disclosure. By way of non-limiting example, the online platform 100 for facility automation may be hosted on a centralized server 102, such as, for example, a cloud computing service. The centralized server 102 may communicate with other network entities, such as, for example, a mobile device 106 (such as a smartphone, a laptop, a tablet computer etc.) and other electronic devices 110 (such as desktop computers, server computers etc.) over a communication network 104, such as, but not limited to, the Internet. Further, users of the platform may include relevant parties such as one or more of facility managers, facility employees, facility customers, and administrators and so on. Accordingly, electronic devices operated by the one or more relevant parties may be in communication with the platform 100.

A user 112, such as the one or more relevant parties, may access platform 100 through a software application. The software application may be embodied as, for example, but not be limited to, a website, a web application, a desktop application, and a mobile application compatible with a computing device 800.

For example, the mobile device 106 may be operated by a restaurant customer booking a table at a restaurant (the facility). The platform 100 may allow the restaurant customers to optimally utilize the time waiting for the table to review the menu and order food so they can get their food as soon as they are seated at the table and reduce waiting time. This also helps the restaurant to serve more customers by reducing the table time as the customers are not spending time ordering and waiting for food at the table. Further, this helps save customers' waiting time as they are optimally engaged whole time.

According to some embodiments, the online platform 100 may communicate with a system 200 for facilitating processing of an order at a facility.

Figure 2:
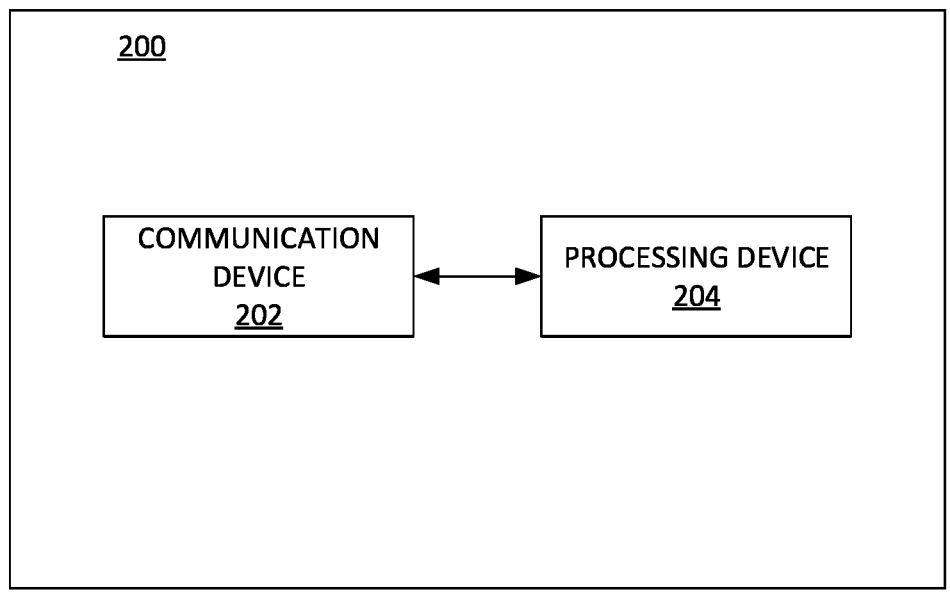
FIG. 2 is a block diagram of a system for facilitating processing of an order at a facility, in accordance with some embodiments.

FIG. 2 is a block diagram of the system 200 for facilitating processing of an order at a facility, in accordance with some embodiments. For example, the facility may be a restaurant. The system 200 may include a communication device 202 configured for receiving a presence indication of a customer device. The presence indication represents a location of the customer device in proximity to the facility. In some embodiments, the communication device 202 may be further configured for receiving a customer location associated with the customer device from the customer device. Further, the system 200 may include a processing device 204 configured for comparing the customer location with a facility location associated with the facility. The comparison may be used to determine presence indication of the customer device.

In some embodiments, the communication device 202 may be further configured for receiving a first code from the customer device. Further, the customer device may be configured to capture the first code based on an interaction with at least one first facility device located in at least one first location. Further, the processing device 204 may be further configured for comparing the first code with a plurality of first codes associated with a plurality of first locations. The received first code may be used to determine presence indication of the customer device.

Further, the communication device 202 may be configured for receiving a reservation request from the customer device. Further, the reservation request may be associated with a reservable area of the facility. For example, the reservable area may be a dining table at the restaurant.

In further embodiments, the interaction may be based on optical capturing of a printed code (such as a barcode, a QR code etc.). Accordingly, at least one facility device may comprise a substrate (e.g. paper or sticker) embodying the first code. In some other embodiments, the interaction may be based on near-field wireless communication between the customer device and the at least one facility device. For instance, the at least one facility device may be configured to transmit a beacon signal with a predetermined unique code (i.e. the first code). Further, the radiation pattern of the beacon signal may be such that the customer device may be able to capture the beacon signal only when the customer device is within the vicinity of the at least one facility device. Accordingly, in such embodiments, the at least one first facility device may comprise RF transmitters.

Further, the communication device 202 may be configured for transmitting a booking code to the customer device. Further, the communication device 202 may be configured for receiving an order data from the customer device. Further, the communication device 202 may be configured for transmitting each of the order data and the booking code to at least one facility processing device.

Further, the processing device 204 may be configured for generating the booking code based on the presence indication and the reservation request. In some embodiments, the booking code may be generated further based on one or more occupancy states associated with one or more reservable areas at the facility.

In some embodiments, the communication device 202 may be further configured for transmitting a reservable area indicator associated with the reservable area to the customer device. For example, the reservable area indicator may be a table number at the restaurant.

In some embodiments, the communication device 202 may be further configured for transmitting location data associated with the reservable area. The location data may include, in some instances, an indication of where within the facility the reservable area is located. In an instance, the location data may include map data representing a floor plan of the facility along with an indication of the reservable area. Additionally, in some instances, the location data may also include route information (e.g. directions such as head straight, turn left/right etc.) in order to guide the customer from a current location to a location of the reservable area.

In some embodiments, the communication device 202 may be further configured for receiving entry event data associated with the reservable area from the customer device. Further, the customer device may be configured to capture a second code associated with the entry event data based on an interaction of the customer device with at least one second facility device located in at least one second location of the facility associated with the reservable area. Further, the processing device 204 may be further configured for updating an occupancy state associated with the reservable area based on the entry event data. For example, the second code (such as a QR code) associated with the entry event data may be placed on a table (the reservable area) at a restaurant (the facility). When the customer reaches the table, the customer may scan the second code using the customer device.

In some embodiments, the communication device 202 may be further configured for transmitting entry event data to the at least one facility processing device.

In some embodiments, the communication device 202 may be further configured for receiving exit event data associated with the reservable area from a staff device. Further, the staff device may be configured to capture the second code associated with the exit event data based on an interaction of the staff device with the at least one second facility device located in at least one second location of the facility associated with the reservable area. Further, the processing device 204 may be further configured for updating the occupancy state associated with the reservable area based on the exit event data. For example, once the customer vacates a table (the reservable area) at a restaurant (the facility), a staff member of the restaurant may use the staff device to scan the second code placed on the table indicating that the table has been vacated.

In some embodiments, the communication device 202 may be further configured for transmitting a service catalogue to the customer device. Further, the order data may include at least one selection of an item in the service catalogue. For example, the service catalogue may be a food menu. Accordingly, a customer may order food based on the service catalogue while waiting for a table (the reservable area) at a restaurant (the facility).

In some embodiments, the communication device 202 may be further configured for receiving facility data from a staff device. For example, the facility data may include one or more of a number of tables, locations of tables, staff information, and food menu. Further, the communication device 202 may be configured for transmitting a plurality of codes to one or more of at least one facility device and the staff device. Further, the processing device 204 may be further configured for generating the plurality of codes based on the facility data. Further, the plurality of codes may include at least one first code associated with at least one first location of the facility and at least one second code associated with at least one second location of the facility.

In some embodiments, the at least one facility device may include active devices (e.g. dynamic QR display devices capable of wirelessly receiving data from the server and displaying them). Alternatively, in some embodiments, the at least one facility device may include beacons configured to receive the first code and the second code from the server and transmit them accordingly.

In some embodiments, the codes (e.g. QR codes) may be transmitted to a staff device such as a laptop computer attached to a printer. Accordingly, a staff member may be able to print out the codes and affix them to appropriate locations (e.g. reception area, dining tables etc.).

Figure 3:
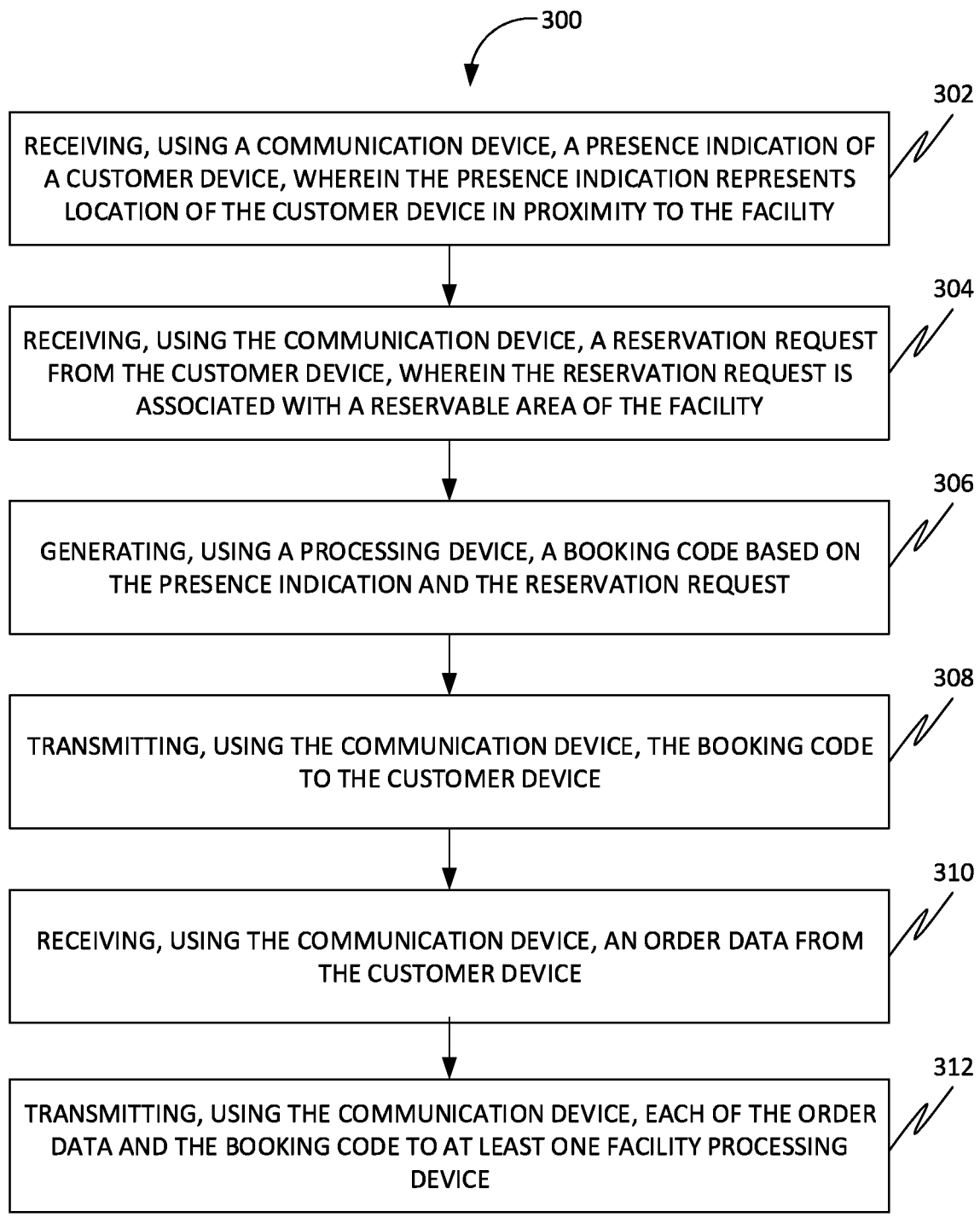
FIG. 3 is a flowchart of a method of facilitating processing of an order at a facility, in accordance with some embodiments.

FIG. 3 is a flowchart of a method 300 of facilitating processing of an order at a facility, in accordance with some embodiments. At 302, the method 300 may include receiving, using a communication device (such as the communication device 202), a presence indication of a customer device. Further, the presence indication represents a location of the customer device in proximity to the facility.

In further embodiments, the receiving the presence indication (at 302) may further include receiving, using the communication device, a customer location associated with the customer device from the customer device and comparing, using the processing device, the customer location with a facility location associated with the facility.

In further embodiments, the receiving the presence indication (at 302) may include receiving, using the communication device, a first code from the customer device. Further, the customer device may be configured to capture the first code based on an interaction with at least one first facility device located in at least one first location. Further, the receiving the presence indication (at 302) may include comparing, using the processing device, the first code with a plurality of first codes associated with a plurality of first locations. In some embodiments, the interaction may be based on optical capturing of a printed code (e.g. a barcode, a QR code etc.). Accordingly, the at least one facility device may comprise a substrate (e.g. paper or sticker) embodying the first code. In some other embodiments, the interaction may be based on near-field wireless communication between the customer device and the at least one facility device. For instance, the at least one facility device may be configured to transmit a beacon signal with a predetermined unique code (i.e. the first code). Further, the radiation pattern of the beacon signal may be such that the customer device may be able to capture the beacon signal only when the customer device is within the vicinity of the at least one facility device. Accordingly, in such embodiments, the at least one first facility device may comprise RF transmitters.

Further, at 304, the method 300 may include receiving, using the communication device, a reservation request from the customer device. Further, the reservation request may be associated with a reservable area of the facility. For example, the reservable area may be a dining table at a restaurant.

At 306, the method 300 may include generating, using a processing device (such as the processing device 204), a booking code based on the presence indication and the reservation request. In some embodiments, the booking code may be generated further based on one or more occupancy states associated with one or more reservable areas.

Further, at 308, the method 300 may include transmitting, using the communication device, the booking code to the customer device. At 310, the method 300 may include receiving, using the communication device, an order data from the customer device. In further embodiments, the method 300 may further include transmitting, using the communication device, a service catalogue to the customer device. For example, the service catalogue may be a food menu. Further, the order data may include at least one selection of an item in the service catalogue. Thereafter, at 312, the method 300 may include transmitting, using the communication device, each of the order data and the booking code to at least one facility processing device. Accordingly, a customer with the customer device may order food based on the service catalogue while waiting for a table (the reservable area) at a restaurant (the facility).

In further embodiments, the method 300 may further include transmitting, using the communication device, a reservable area indicator associated with the reservable area to the customer device. For example, the reservable area indicator may be a table number at a restaurant.

In further embodiments, the method 300 may include transmitting, using the communication device, location data associated with the reservable area. The location data may include, in some instances, an indication of where within the facility the reservable area is located. In an instance, the location data may include map data representing a floor plan of the facility along with an indication of the reservable area. Additionally, in some instances, the location data may also include route information (e.g. directions such as head straight, turn left/right etc.) in order to guide a customer from a current location to a location of the reservable area.

Figure 4:
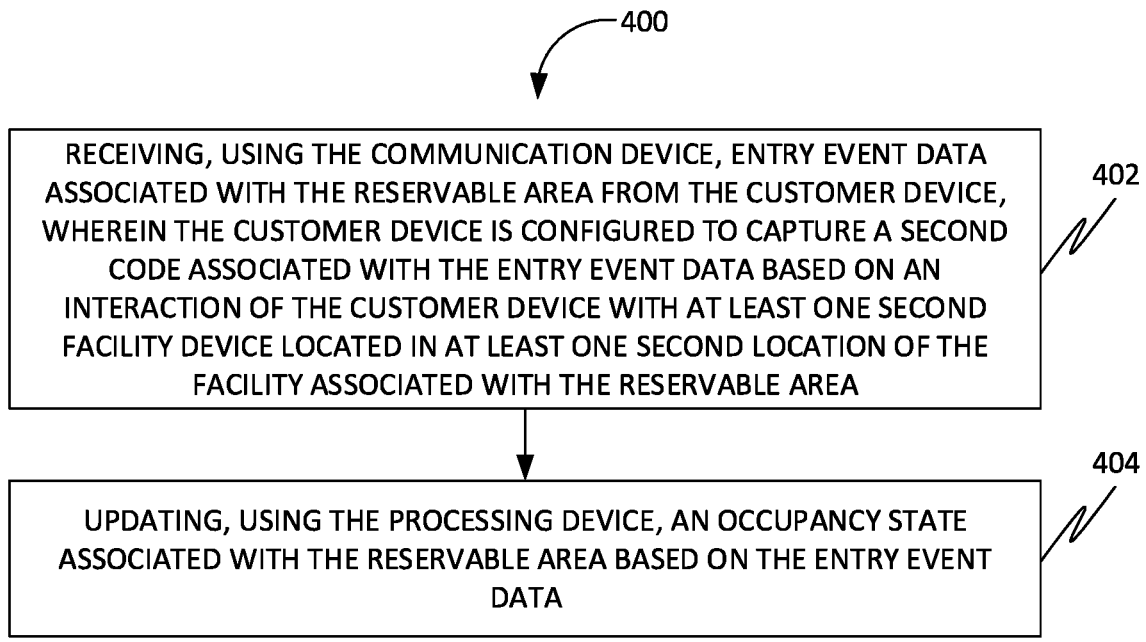
FIG. 4 is a flowchart of a method of modifying an occupancy state associated with a reservable area, in accordance with some embodiments.

FIG. 4 is a flowchart of a method 400 of modifying an occupancy state associated with the reservable area, in accordance with some embodiments. At 402, the method 400 may include receiving, using the communication device, entry event data associated with the reservable area from the customer device. Further, the customer device may be configured to capture a second code associated with the entry event data based on an interaction of the customer device with at least one second facility device located in at least one second location of the facility associated with the reservable area. At 404, the method 400 may include updating, using the processing device, an occupancy state associated with the reservable area based on the entry event data. For example, the second code (such as a QR code) associated with the entry event data may be placed on a table (the reservable area) at a restaurant (the facility). When the customer reaches the table, the customer may scan the second code using the customer device.

In some embodiments, the method 400 may further include transmitting, using the communication device, entry event data to the at least one facility processing device.

In further embodiments, the method 400 may further include receiving, using the communication device, exit event data associated with the reservable area from a staff device. Further, the staff device may be configured to capture the second code associated with the exit event data based on an interaction of the staff device with the at least one second facility device located in at least one second location of the facility associated with the reservable area. Moreover, the method 400 may include updating, using the processing device, the occupancy state associated with the reservable area based on the exit event data. For example, once the customer vacates a table (the reservable area) at a restaurant (the facility), a staff member of the restaurant may use the staff device to scan the second code placed on the table indicating that the table has been vacated.

Figure 5:
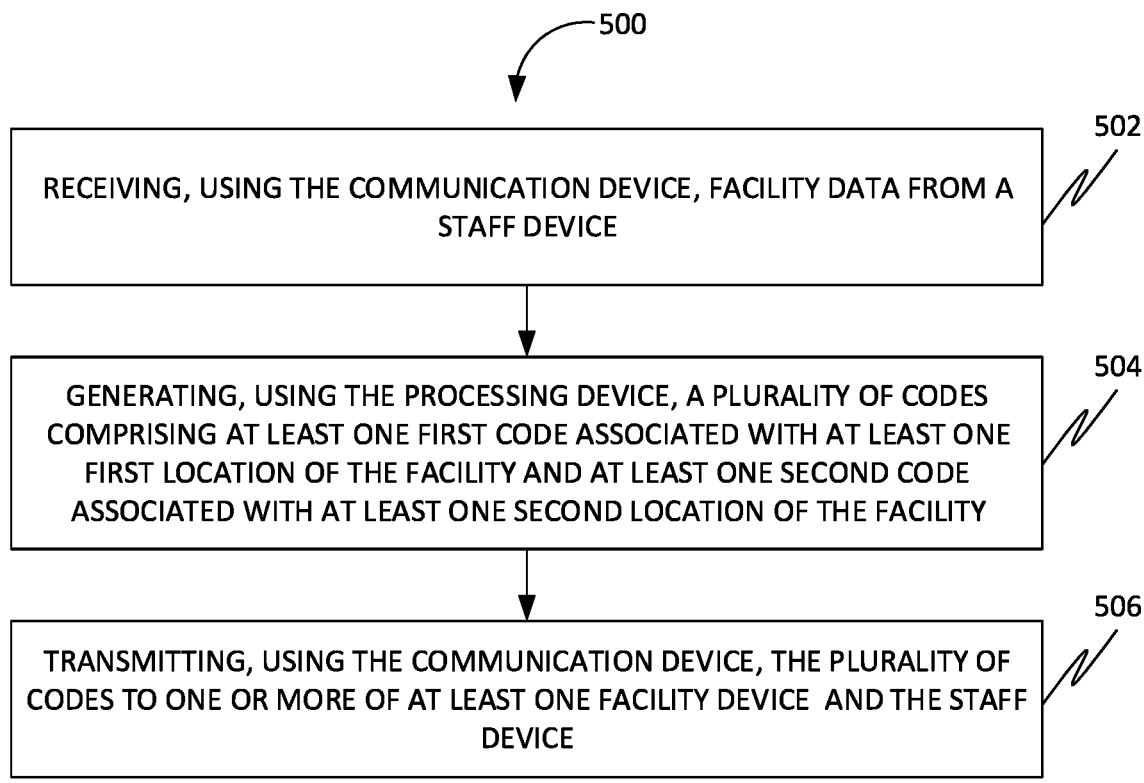
FIG. 5 is a flowchart of a method of providing facility data, in accordance with some embodiments.

FIG. 5 is a flowchart of a method 500 of providing facility data, in accordance with some embodiments. For example, the facility data may include one or more of a number of tables, locations of tables, staff information, and food menu. At 502, the method 500 may include receiving, using the communication device, facility data from a staff device. At 504, the method 500 may include generating, using the processing device, a plurality of codes including at least one first code associated with at least one first location of the facility and at least one second code associated with at least one second location of the facility. Further, at 506, the method 500 may include transmitting, using the communication device, the plurality of codes to one or more of at least one facility device and the staff device.

In some embodiments, the at least one facility device may include active devices (e.g. dynamic QR display devices capable of wirelessly receiving data from the server and displaying them). Alternatively, in some embodiments, the at least one facility device may include beacons configured to receive the first code and the second code from the server and transmit them accordingly.

In some embodiments, the codes (e.g. QR codes) may be transmitted to a staff device such as a laptop computer attached to a printer. Accordingly, a staff member may be able to print out the codes and affix them to appropriate locations (e.g. reception area, dining tables etc.).

Figure 6:
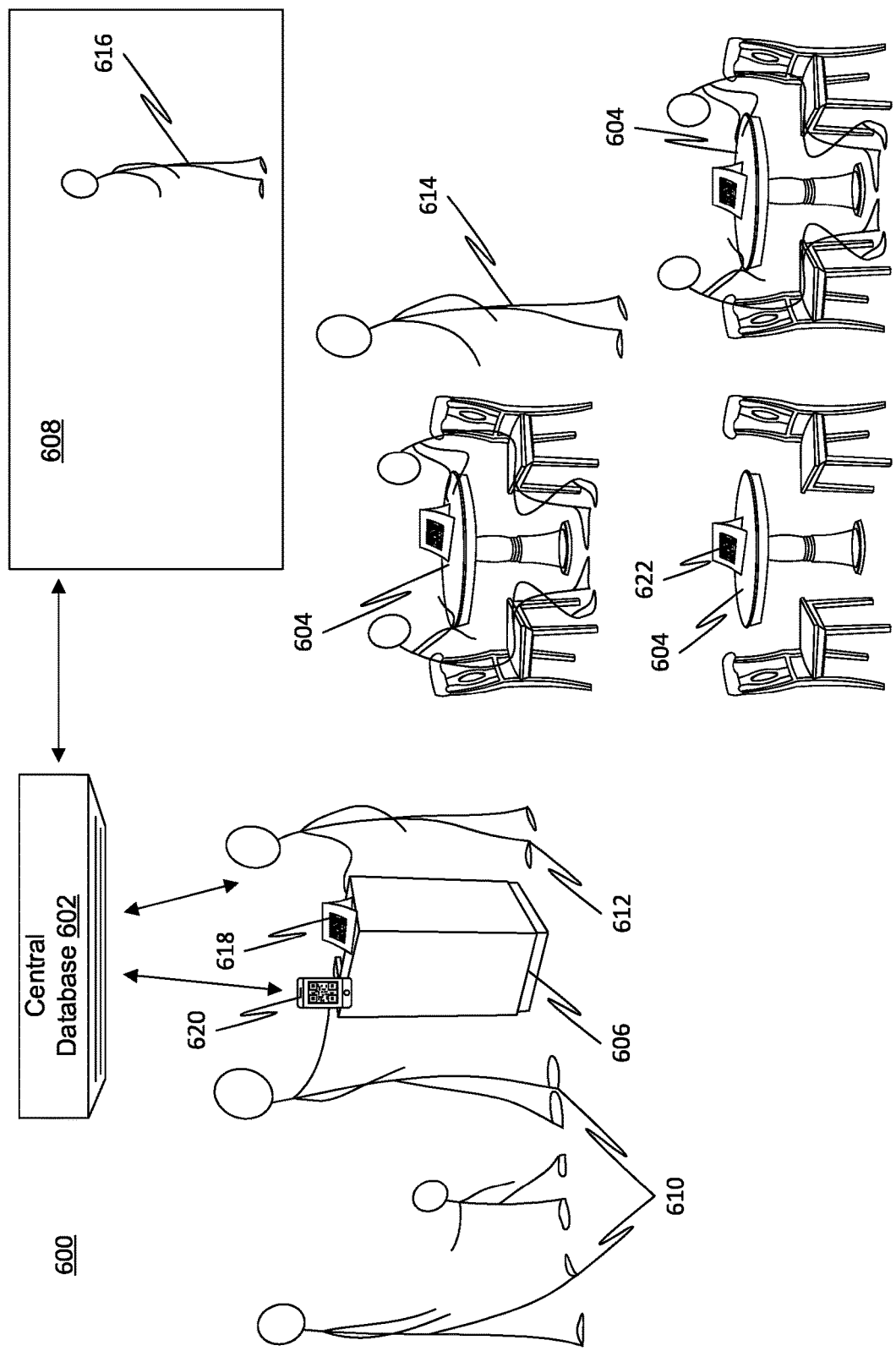
FIG. 6 illustrates an environment in which the present invention may work, in accordance with an exemplary embodiment.

FIG. 6 illustrates an exemplary environment 600 in which the present invention may work, in accordance with some embodiments. The environment 600 includes a central database 602 (available on a server such as the centralized server 102) and a restaurant with multiple tables 604, a reception area with a reception desk 606, a kitchen area 608, restaurant customers 610 and restaurant employees. The restaurant employees may include one or more managers (such as a manager 612), one or more waiters (such as a waiter 614), and one or more cooks (such as a cook 616)

Figure 7:
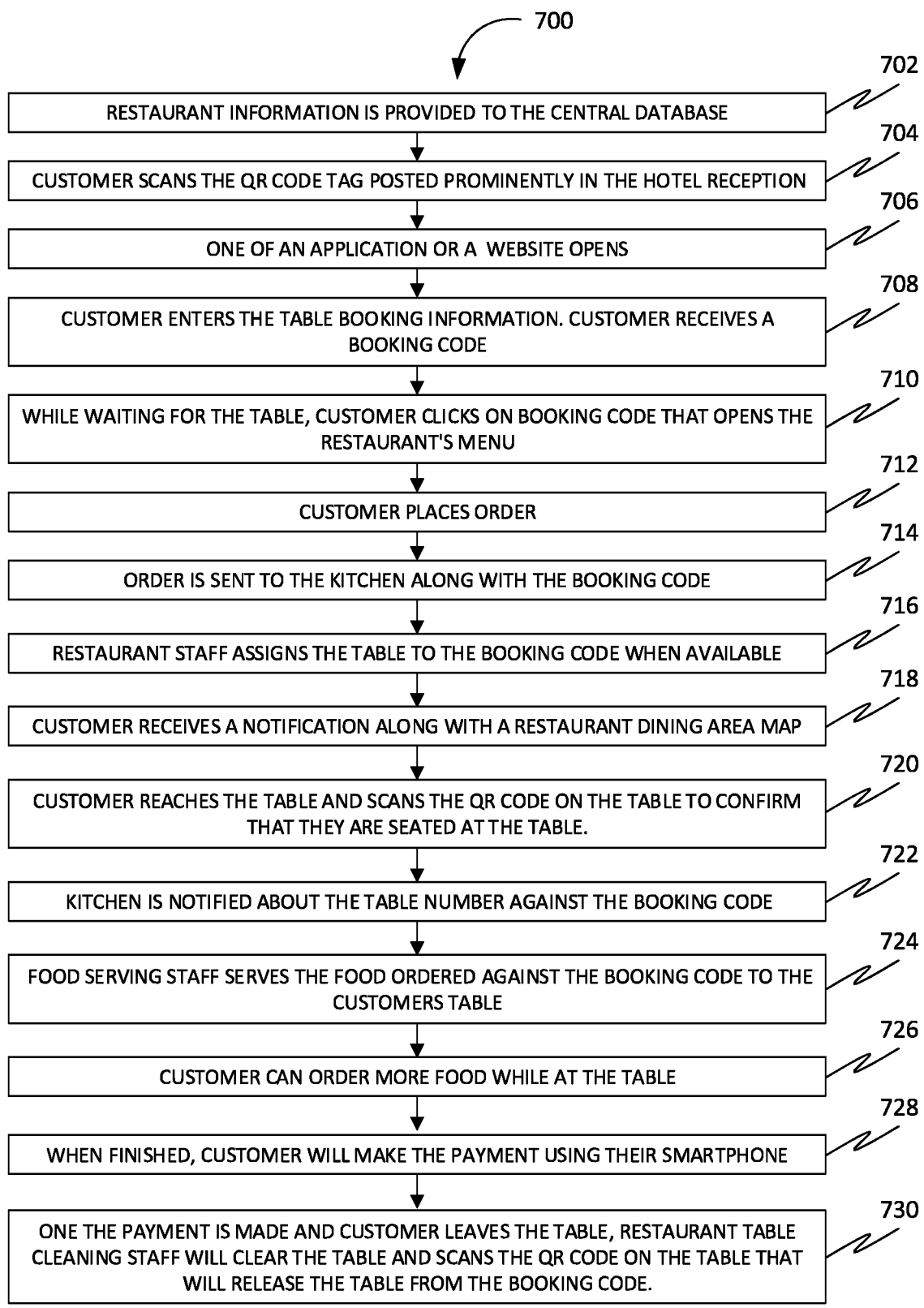
FIG. 7 is a flowchart of a method for automating the restaurant dining experience, in accordance with some embodiments.

FIG. 7 is a flowchart of a method 700 of automating restaurant dining experience at the restaurant shown in FIG. 6, in accordance with some embodiments. At 702, the method 700 may include a restaurant employee (such as a restaurant owner, or the restaurant manager 612) providing restaurant information into the central database 602 using one of a website and a software application (such as a smartphone application). The restaurant information may include details of the restaurant employees 612-614, dining tables, a menu and a map of the dining area. The restaurant employees 612-616 may be provided role-based permissions in one of the website or the software application to allocate table, and view one or more of a food order, a booking code, and a table number.

When the restaurant customer 610 visits the restaurant, the restaurant customer 610 may scan a QR Code Tag 618 at 704. The QR Code Tag 618 may be placed prominently on the reception desk 606. The restaurant customer 610 may scan the QR Code Tag 618 using a QR Code Scanner application on their smartphone 620. Thereafter, if the smartphone 620 has the respective application installed, the application opens at 706. However, if the application is not installed on the smartphone 620, the respective website opens in the web browser at 706. Next, the restaurant customer 610 may choose to create an account or continue as a guest by providing a phone number or an email ID via one of the application and the website.

Further, at 708, the restaurant customer 610 enters the table booking information in one of the application and the website. The table booking information may include a number of persons, a number of child seats required, and any other special requests. The table booking information may be then sent to the central database 602.

Thereafter, the restaurant customer 610 receives a booking code in the application or via a text message or an email depending on their configuration, from the central database 602. Accordingly, while waiting for the table, the restaurant customer 610 clicks on booking code that opens the restaurant's menu in one of the application and the website at 710. Then, the restaurant customer 610 reviews the menu, chooses the food items to be ordered and places the order at 712.

Next, at 714, the placed order is sent to a device in the kitchen area 608 along with the booking code via the central database 602. Thereafter, the waiter 614 may assign the table to the booking code (at 716), when the table is available, using one of the application and the website.

Next, at 718, the restaurant customer 610 receives a notification in one of the application and the website on their smartphone 620 (or via SMS/email) along with a restaurant dining area map. Thereafter, at 720, the restaurant customer reaches the assigned table and scans a QR Code 622 placed on the table 604 to confirm (with the central database 602) that they are seated at the table. Then, the cook 616 is notified about the table number against the booking code (via the central database 602) at 722.

Thereafter, the waiter 614 may serve the food ordered against the booking code to the customers' table at 724. At 726, the restaurant customer 610 may order more food using one of the application and the website on their smartphone 620 while sitting at the table.

When finished, the restaurant customer may make the payment (at 728) using their smartphone 620. Once the payment is made and the restaurant customer 610 leaves the table. Then, the waiter 614 may clear the table and scan the QR Code 622 on the table 604 that releases the table from the booking code (at the central database 602).

Figure 8:
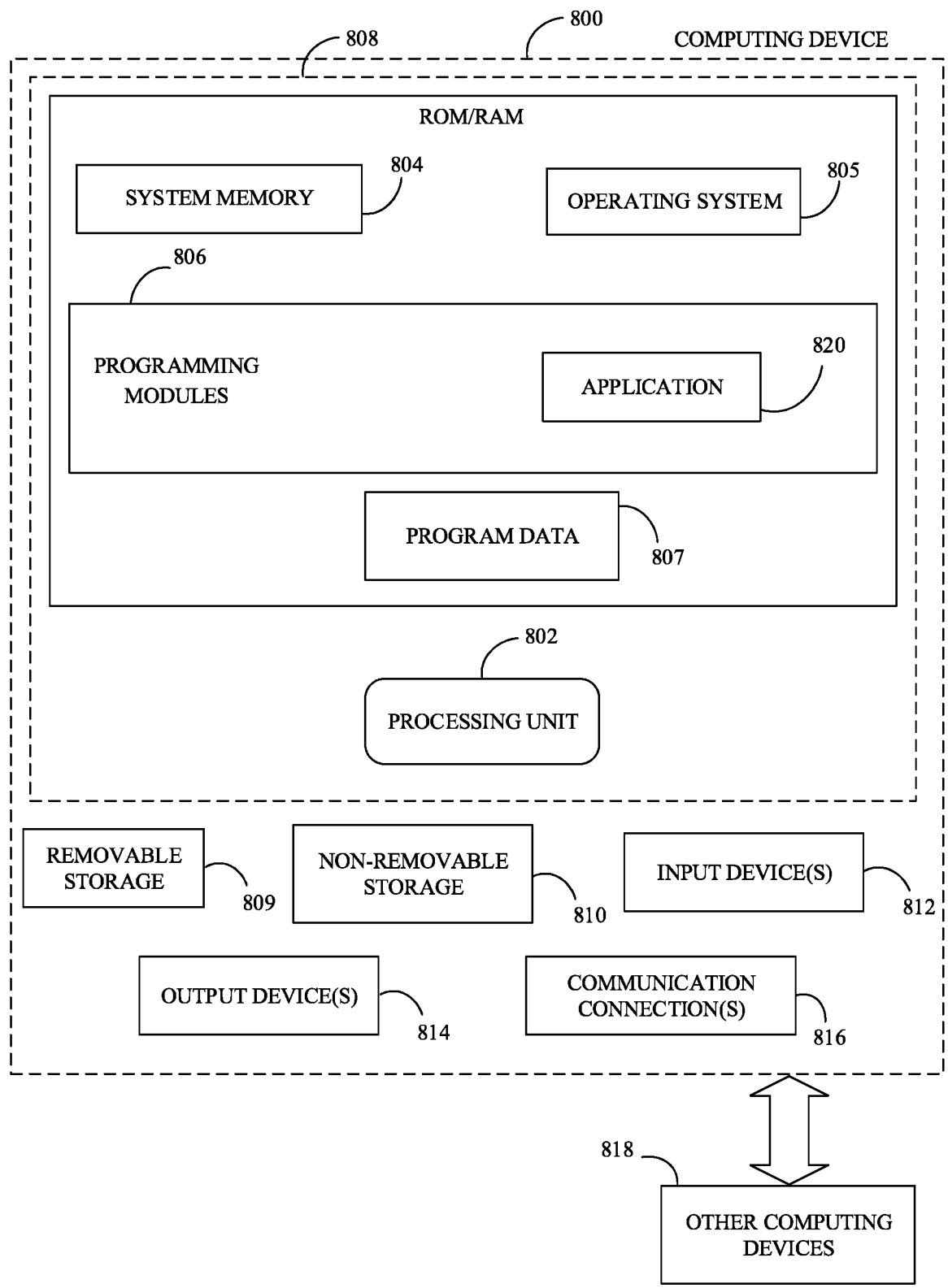
FIG. 8 is a block diagram of a computing device for implementing the methods disclosed herein, in accordance with some embodiments.

FIG. 8 is a block diagram of a computing device for implementing the methods disclosed herein, in accordance with some embodiments. Consistent with an embodiment of the disclosure, the aforementioned storage device and processing device may be implemented in a computing device, such as computing device 800 of FIG. 8. Any suitable combination of hardware, software, or firmware may be used to implement the memory storage and processing unit. For example, the storage device and the processing device may be implemented with computing device 800 or any of other computing devices 818, in combination with computing device 800. The aforementioned system, device, and processors are examples and other systems, devices, and processors may comprise the aforementioned storage device and processing device, consistent with embodiments of the disclosure.

With reference to FIG. 8, a system consistent with an embodiment of the disclosure may include a computing device or cloud service, such as computing device 800. In a basic configuration, computing device 800 may include at least one processing unit 802 and a system memory 804. Depending on the configuration and type of computing device, system memory 804 may comprise, but is not limited to, volatile (e.g. random access memory (RAM)), non-volatile (e.g. read-only memory (ROM)), flash memory, or any combination. System memory 804 may include operating system 805, one or more programming modules 806, and may include a program data 807. Operating system 805, for example, may be suitable for controlling computing device 800's operation. Furthermore, embodiments of the disclosure may be practiced in conjunction with a graphics library, other operating systems, or any other application program and is not limited to any particular application or system. This basic configuration is illustrated in FIG. 8 by those components within a dashed line 808.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by a removable storage 809 and a non-removable storage 810. Computer storage media may include volatile and nonvolatile, removable and non-removable media implemented in any method or technology for storage of information, such as computer-readable instructions, data structures, program modules, or other data. System memory 804, removable storage 809, and non-removable storage 810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 800. Any such computer storage media may be part of device 800. Computing device 800 may also have input device(s) 812 such as a keyboard, a mouse, a pen, a sound input device, a touch input device, etc. Output device(s) 814 such as a display, speakers, a printer, etc. may also be included. The aforementioned devices are examples and others may be used.

Computing device 800 may also contain a communication connection 816 that may allow device 800 to communicate with other computing devices 818, such as over a network in a distributed computing environment, for example, an intranet or the Internet. Communication connection 816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 804, including operating system 805. While executing on processing unit 802, programming modules 806 (e.g., application 820) may perform processes including, for example, one or more stages of methods 300-500 and 700, algorithms, system 200, applications, servers, databases as described above. The aforementioned process is an example, and processing unit 802 may perform other processes. Other programming modules that may be used in accordance with embodiments of the present disclosure may include sound encoding/decoding applications, machine learning application, acoustic classifiers etc.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

What is claimed is:

1. A method of facilitating processing of an order at a facility, the method comprising:
   receiving, using a communication device, a presence indication of a customer device, wherein the presence indication represents a location of the customer device in proximity to the facility;
   receiving, using the communication device, a reservation request from the customer device, wherein the reservation request is associated with a reservable area of the facility;
   generating, using a processing device, a booking code based on the presence indication and the reservation request;
   transmitting, using the communication device, the booking code to the customer device;
   receiving, using the communication device, an order data from the customer device;
   transmitting, using the communication device, each of the order data and the booking code to at least one facility processing device;
   receiving, using the communication device, entry event data associated with the reservable area from the customer device, wherein the customer device is configured to capture a second code associated with the entry event data based on an interaction of the customer device with at least one second facility device located in at least one second location of the facility associated with the reservable area;
   updating, using the processing device, an occupancy state associated with the reservable area based on the entry event data;
   receiving, using the communication device, exit event data associated with the reservable area from a staff device, wherein the staff device is configured to capture the second code associated with the exit event data based on an interaction of the staff device with the at least one second facility device located in at least one second location of the facility associated with the reservable area; and
   updating, using the processing device, the occupancy state associated with the reservable area based on the exit event data.

2. The method of claim 1, wherein receiving the presence indication comprises:
   receiving, using the communication device, a customer location associated with the customer device from the customer device; and
   comparing, using the processing device, the customer location with a facility location associated with the facility.

3. The method of claim 1, wherein receiving the presence indication comprises:
   receiving, using the communication device, a first code from the customer device, wherein the customer device is configured to capture the first code based on an interaction with at least one first facility device located in at least one first location; and
   comparing, using the processing device, the first code with a plurality of first codes associated with a plurality of first locations.

4. The method of claim 1 further comprising transmitting, using the communication device, a reservable area indicator associated with the reservable area to the customer device.

5. The method of claim 4 further comprising transmitting, using the communication device, location data associated with the reservable area.

6. The method of claim 1 further comprising transmitting, using the communication device, entry event data to the at least one facility processing device.

7. The method of claim 1 further comprising transmitting, using the communication device, a service catalogue to the customer device, wherein the order data comprises at least one selection of an item in the service catalogue.

8. The method of claim 1 further comprising:
   receiving, using the communication device, facility data from a staff device;
   generating, using the processing device, a plurality of codes comprising at least one first code associated with at least one first location of the facility and at least one second code associated with at least one second location of the facility; and
   transmitting, using the communication device, the plurality of codes to one or more of at least one facility device and the staff device.

9. A system for facilitating processing of an order at a facility, the system comprising:
   a communication device configured for:
      receiving, using a communication device, a presence indication of a customer device, wherein the presence indication represents a location of the customer device in proximity to the facility;

receiving a reservation request from the customer device, wherein the reservation request is associated with a reservable area of the facility;

transmitting a booking code to the customer device;

receiving an order data from the customer device; and transmitting each of the order data and the booking code to at least one facility processing device;

a processing device configured for generating, using a processing device, the booking code based on the presence indication and the reservation request;

the communication device further configured for receiving entry event data associated with the reservable area from the customer device;

the customer device further configured for capturing a second code associated with the entry event data based on an interaction of the customer device with at least one second facility device located in at least one second location of the facility associated with the reservable area;

the processing device further configured for updating an occupancy state associated with the reservable area based on the entry event data;

the communication device further configured for receiving exit event data associated with the reservable area from a staff device;

the staff device configured for capturing the second code associated with the exit event data based on an interaction of the staff device with the at least one second facility device located in at least one second location of the facility associated with the reservable area; and the processing device further configured for updating the occupancy state associated with the reservable area based on the exit event data.

10. The system of claim 9, wherein the communication device is further configured for receiving a customer location associated with the customer device from the customer device, wherein the processing device is further configured for comparing the customer location with a facility location associated with the facility.

11. The system of claim 9, wherein the communication device is further configured for receiving a first code from the customer device, wherein the customer device is configured to capture the first code based on an interaction with at least one first facility device located in at least one first location, wherein the processing device is further configured for comparing the first code with a plurality of first codes associated with a plurality of first locations.

12. The system of claim 9, wherein the communication device is further configured for transmitting a reservable area indicator associated with the reservable area to the customer device.

13. The system of claim 12, wherein the communication device is further configured for transmitting location data associated with the reservable area.

14. The system of claim 9, wherein the communication device is further configured for transmitting entry event data to the at least one facility processing device.

15. The system of claim 9, wherein the communication device is further configured for transmitting a service catalogue to the customer device, wherein the order data comprises at least one selection of an item in the service catalogue.

16. The system of claim 9, wherein the communication device is further configured for receiving facility data from a staff device; and transmitting a plurality of codes to one or more of at least one facility device and the staff device, wherein the processing device is further configured for generating the plurality of codes based on the facility data, wherein the plurality of codes comprises at least one first code associated with at least one first location of the facility and at least one second code associated with at least one second location of the facility.

* * * * *